United States Patent
Yeddala et al.

(10) Patent No.: US 9,813,945 B2
(45) Date of Patent: Nov. 7, 2017

(54) SYSTEM AND METHOD FOR END-TO-END QUALITY OF SERVICE CONTROL FOR A REMOTE SERVICE GATEWAY

(71) Applicant: Time Warner Cable Enterprises LLC, New York, NY (US)

(72) Inventors: Kiran R. Yeddala, Ashburn, VA (US); Arun Manroa, Herndon, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 152 days.

(21) Appl. No.: 14/971,084

(22) Filed: Dec. 16, 2015

(65) Prior Publication Data

US 2017/0181038 A1   Jun. 22, 2017

(51) Int. Cl.
| | |
|---|---|
| *H04W 28/20* | (2009.01) |
| *H04W 24/02* | (2009.01) |
| *H04W 24/08* | (2009.01) |
| *H04W 28/02* | (2009.01) |
| *H04W 72/12* | (2009.01) |
| *H04W 72/08* | (2009.01) |
| *H04W 72/04* | (2009.01) |
| *H04W 84/12* | (2009.01) |

(52) U.S. Cl.
CPC ........... *H04W 28/20* (2013.01); *H04W 24/02* (2013.01); *H04W 24/08* (2013.01); *H04W 28/0268* (2013.01); *H04W 72/0453* (2013.01); *H04W 72/08* (2013.01); *H04W 72/1226* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2002/0009060 A1* | 1/2002 | Gross | H04B 7/18515 370/321 |
| 2004/0008724 A1* | 1/2004 | Devine | H04L 12/6418 370/466 |
| 2005/0105559 A1* | 5/2005 | Cain | H04J 3/12 370/498 |
| 2005/0254440 A1* | 11/2005 | Sorrell | H04L 29/06027 370/264 |

(Continued)

*Primary Examiner* — Eunsook Choi
(74) *Attorney, Agent, or Firm* — Chapin IP Law, LLC

(57) ABSTRACT

Systems and methods of performing end-to-end QoS control during the access of Wi-Fi-enabled communications devices to remote networks. The systems and methods employ a bandwidth manager, a policy server, a near-end gateway located within a Wi-Fi network, and a far-end gateway located within a service provider network. Throughout the duration of a call placed by a wireless device user using a Wi-Fi-enabled communications device, the bandwidth manager can have access to service profiles stored in a database of the policy server for use in monitoring levels of bandwidth usage, for tunneled and/or local breakout traffic, at least at the near-end gateway to the service provider network and at the far-end gateway to a remote network, and performing end-to-end QoS control by dynamically making adjustments, as needed, to one or more service profiles at least at the near-end gateway and/or at the far-end gateway based on the monitored bandwidth usage levels.

31 Claims, 3 Drawing Sheets

(56) References Cited

U.S. PATENT DOCUMENTS

| | | | | |
|---|---|---|---|---|
| 2008/0008160 | A1* | 1/2008 | Uhler | H04L 12/66 |
| | | | | 370/352 |
| 2012/0218887 | A1* | 8/2012 | Khilnani | H04L 43/0876 |
| | | | | 370/230 |
| 2012/0314761 | A1* | 12/2012 | Melnyk | H04L 65/605 |
| | | | | 375/240.02 |
| 2015/0334716 | A1* | 11/2015 | Coffman | H04W 28/20 |
| | | | | 370/237 |
| 2016/0065995 | A1* | 3/2016 | Phillips | H04N 21/238 |
| | | | | 725/62 |

* cited by examiner

SYSTEM AND METHOD FOR END-TO-END QUALITY OF SERVICE CONTROL FOR A REMOTE SERVICE GATEWAY

TECHNICAL FIELD

The present application relates generally to systems and methods of controlling the access of Wireless Fidelity (Wi-Fi)-enabled communications devices to remote networks, and more specifically to systems and methods of performing end-to-end Quality of Service (QoS) control during such access of Wi-Fi-enabled communications devices to remote networks.

BACKGROUND

In recent years, Wireless Fidelity (Wi-Fi) networks have been increasingly deployed in urban areas, office buildings, and college campuses, as well as public venues such as airports, stadiums, coffee shops, and hotels. Such Wi-Fi networks can allow virtually any Wi-Fi-enabled communications device (also referred to herein as the "Wi-Fi-enabled device"), such as a Wi-Fi-enabled smartphone, tablet computer, or laptop computer, to access remote networks, such as the Internet, via wireless access points located within the Wi-Fi networks. Such wireless access points can be configured to operate with wireless access point controllers (also referred to herein as "Wi-Fi controllers"), which can be located either within the Wi-Fi networks themselves or within service provider networks communicably coupled to the Wi-Fi networks. For example, a wireless access point in combination with a Wi-Fi controller may be configured to support Hotspot 2.0, which is a technology based on the Institute of Electrical and Electronic Engineers (IEEE) 802.11u, 802.11i, and 802.1x standards and generally known as Wi-Fi-certified Passpoint™. Further, a wireless device user may employ his or her Wi-Fi-enable device to access a remote network (e.g., the Internet) via a wireless access point, which may be located within a Wi-Fi network deployed in a particular venue, but operating in conjunction with a Wi-Fi controller located within a service provider network.

In a typical scenario, a wireless device user with a Wi-Fi-enabled device (e.g., a Wi-Fi-enabled smartphone, tablet computer, laptop computer) can enter a communication range of a wireless access point located within a Wi-Fi network deployed in a particular venue, such as a hotel. For example, the hotel venue may be a subscriber or account holder of a service provider network. Having entered the communication range of the wireless access point, the Wi-Fi-enabled device can receive, from the wireless access point, a beacon message indicating that the wireless access point is configured to support Hotspot 2.0. If the Wi-Fi-enabled device is also configured to support Hotspot 2.0, then the Wi-Fi-enabled device can, using a protocol defined in one or more of the IEEE 802.11 series of standards, exchange messages with the wireless access point in order to become associated with the wireless access point, and also exchange messages with an authentication server in order to be authenticated by the authentication server. For example, such an authentication server may be located within the Wi-Fi network or communicably coupled to the service provider network, and may be configured to conform to the Remote Authentication Dial-In User Service (RADIUS) protocol.

Once the Wi-Fi-enabled device becomes associated with the wireless access point and is authenticated by the authentication server, the wireless device user can place a call, such as a voice call, a video call, or a data call, to another communications device, such as a smartphone, a tablet computer, or a laptop computer. For example, such placement of a call by the wireless device user using his or her Wi-Fi-enabled device may include accessing, over the Wi-Fi and service provider networks, a remote network (e.g., the Internet) to which the other communications device can be communicably coupled. Such call placement by the wireless device user may further include tagging, by the wireless access point, a packet flow for the call with Quality of Service (QoS) bits indicative of a QoS level appropriate for the type (voice, video, data) of call. For example, a voice call may require an enhanced QoS level, a data call may have a reduced QoS level, and a video call may require a QoS level that is intermediate to the respective QoS levels of the voice and data calls. Further, such QoS levels may be specified in a QoS policy that may be enforced by at least the wireless access point located within the Wi-Fi network deployed in the hotel venue.

Once the voice call, video call, or data call is placed by the wireless device user, the wireless access point located within the Wi-Fi network deployed in the hotel venue can operate in conjunction with a Wi-Fi controller located within the service provider network in order to complete the call. For example, the wireless access point at the hotel venue location may store a service profile for use in enforcing the QoS policy that corresponds to the QoS level for the type (voice, video, data) of call placed by the wireless device user. Such a QoS policy can include access control lists, as well as a number of rules and/or criteria associated with certain call packet flows, wireless device users, and/or wireless device user groups, etc. The wireless access point can operate to enforce the QoS policy corresponding to the QoS level for the call by tagging a packet flow for the call with QoS bits indicative of the QoS level, as well as modifying the access of certain wireless device users and/or user groups and prioritizing certain call packet flows in accordance with various rules and/or criteria, in an effort to maintain an optimal quality of service for the wireless device user at the hotel venue location.

The typical scenario described herein for accessing a remote network with a Wi-Fi-enabled device from a particular venue location has drawbacks, however, in that it can frequently be difficult to perform end-to-end QoS control throughout the duration of a call. For example, the QoS bits that are typically tagged to a packet flow for the call at the particular venue location may be stripped off the call packet flow or otherwise lost by the time the call packet flow reaches the service provider network. Further, the service provider network may have no knowledge of the QoS policy currently being enforced at that particular venue location, and may therefore be incapable of handling the call packet flow with the QoS level appropriate for the type (voice, video, data) of call. In addition, a local breakout may be allowed for some packet flows in order to allow such packet flows to be directly routed from the particular venue location to the Internet. However, it can be difficult to adapt the QoS policy being enforced at the particular venue location for call packet flows (including those that are subject to local breakout) to changes in packet flow conditions that might occur within the service provider network. Moreover, call load conditions either within the Wi-Fi network deployed in the particular venue and/or within the service provider network may vary significantly during the call, making it difficult to maintain a bandwidth commensurate with the QoS level for the call.

It would therefore be desirable to have systems and methods of performing end-to-end QoS control during the access of Wi-Fi-enabled devices to remote networks that can avoid at least some of the drawbacks of existing systems and methods of QoS policy enforcement.

SUMMARY

In accordance with the present application, systems and methods are disclosed for performing end-to-end Quality of Service (QoS) control during the access of Wireless Fidelity (Wi-Fi)-enabled communications devices to remote networks. The disclosed systems and methods can achieve such end-to-end QoS control by employing a bandwidth manager, a policy server, a near-end gateway located within a Wi-Fi network, and a far-end gateway located within a service provider network. Throughout the duration of a call placed by a wireless device user using a Wi-Fi-enabled communications device, the bandwidth manager can have access to one or more service profiles stored in a database of the policy server for use in (1) monitoring levels of bandwidth usage at least at the near-end gateway to the service provider network and at the far-end gateway to a remote network, and (2) performing end-to-end QoS control by dynamically making adjustments, as needed, to one or more service profiles stored at least at the near-end gateway and/or at the far-end gateway based on the monitored bandwidth usage levels.

In one aspect, a system for performing end-to-end Quality of Service (QoS) control during the access of a Wi-Fi-enabled communications device (also referred to herein as the "Wi-Fi-enable device") to a remote network includes a bandwidth manager, a policy server, and a client service gateway to the remote network. The client service gateway (also referred to herein as the "far-end gateway") is communicably coupleable to a wireless access point controller (also referred to herein as the "Wi-Fi controller"). In an exemplary aspect, the far-end gateway and the Wi-Fi controller can each be located within a service provider network. The Wi-Fi controller is communicably coupled to at least one wireless access point through a respective wireless access point gateway to the service provider network. In a further exemplary aspect, the wireless access point gateway (also referred to herein as the "near-end gateway") and the wireless access point can each be located within a Wi-Fi network deployed in a particular venue, such as a hotel venue, which may be a subscriber or account holder of the service provider network. The policy server can include a database configured to store one or more service profiles, in which each service profile can specify one or more QoS classes for inbound and/or outbound packet flows based at least on the type (voice, video, data) of call placed using the Wi-Fi-enabled device. The bandwidth manager, the near-end gateway, the far-end gateway, and the wireless access point can each likewise be configured to store one or more service profiles. The bandwidth manager can be further configured to store one or more bandwidth profiles including one or more bandwidth thresholds for use in monitoring bandwidth usage at least at the wireless access point, the near-end gateway to the service provider network, and the far-end gateway to the remote network. The wireless access point, the near-end gateway, and the far-end gateway can each include a management interface through which the bandwidth manager can (1) monitor levels of bandwidth usage at the respective access point and gateway devices, and (2) perform end-to-end QoS control by dynamically making adjustments, as needed, to the service profile(s) stored at the respective access point and gateway devices based on the monitored bandwidth usage levels.

In one mode of operation, the wireless device user with his or her Wi-Fi-enabled device (e.g., a Wi-Fi-enabled smartphone, tablet computer, laptop computer) can enter a communication range of the wireless access point located within the Wi-Fi network deployed in the hotel venue. Having entered the communication range of the wireless access point, the Wi-Fi-enabled device can receive, from the wireless access point, a beacon message indicating that the wireless access point is configured to support Hotspot 2.0, which is a technology based on the Institute of Electrical and Electronic Engineers (IEEE) 802.11u, 802.11i, and 802.1x standards and generally known as Wi-Fi-certified Passpoint™, or any other suitable wireless technology. If the Wi-Fi-enabled device is also configured to support Hotspot 2.0, then the Wi-Fi-enabled device can, using a protocol defined in one or more of the IEEE 802.11 series of standards, exchange messages with the wireless access point in order to become associated with the wireless access point, and also exchange messages with an authentication server in order to be authenticated by the authentication server. For example, such an authentication server may be located within the Wi-Fi network deployed in the hotel venue or communicably coupled to the service provider network, and may be configured to conform to the Remote Authentication Dial-In User Service (RADIUS) protocol, or any other suitable protocol.

Once the Wi-Fi-enabled device becomes associated with the wireless access point and is authenticated by the authentication server, the wireless device user can place a call, such as a voice call, a video call, or a data call, to another communications device, such as a smartphone, a tablet computer, or a laptop computer. Such placement of a call by the wireless device user using his or her Wi-Fi-enabled device can include accessing, over the Wi-Fi and service provider networks, the remote network (e.g., the Internet) to which the other communications device is communicably coupleable. Such call placement by the wireless device user can further include tagging, by the wireless access point, a packet flow for the call with QoS bits indicative of a QoS level appropriate for the type (voice, video, data) of call. For example, a voice call may require an enhanced QoS level, a data call may have a reduced QoS level, and a video call may require a QoS level that is intermediate to the respective QoS levels of the voice and data calls. Further, the wireless access point and/or the near-end gateway located within the Wi-Fi network may each be configured to store a service profile for the hotel venue, in which the service profile includes a QoS policy that specifies one or more QoS levels for calls and can be enforced by the wireless access point and/or the near-end gateway at the hotel venue location.

The near-end gateway located within the Wi-Fi network deployed in the hotel venue can send the packet flow for the call to the Wi-Fi controller located within the service provider network, and the Wi-Fi controller can forward the call packet flow (such a forwarded call packet flow is also referred to herein as "tunneled traffic") to the far-end gateway also located within the service provider network. In an exemplary aspect, the packet flow for the call can be identified by a network address, which the far-end gateway can use to determine that the tunneled traffic originated from the hotel venue location. Upon determining that the tunneled traffic originated from the hotel venue location, the far-end gateway can send a message to the policy server in order to request a copy of the service profile for the hotel venue. In a further exemplary aspect, the service profile for the hotel venue can include the hotel venue's identification (ID) profile, bandwidth profile, QoS profile, access profile, and/or any other suitable profile information pertaining to the hotel venue's subscription to the service provider network. In another exemplary aspect, the service profile for the hotel venue can specify one or more QoS classes for inbound and/or outbound packet flows based at least on the types (voice, video, data) of calls placed by wireless device users using their Wi-Fi-enabled devices at the hotel venue location. Each QoS class can define, for each type (voice, video, data) of call, at least a preferential bandwidth allocation for inbound and/or outbound packet flows, a preferential routing of the respective packet flows, and/or a preferential queuing of the respective packet flows, etc.

Having received the request message from the far-end gateway for a copy of the hotel venue's service profile, the policy server can access the hotel venue's service profile from its database, send a copy of the hotel venue's service profile to the far-end gateway for storage therein, and forward a copy of the same service profile for the hotel venue to the bandwidth manager for storage therein. In an exemplary aspect, a system administrator can configure the bandwidth manager to store a bandwidth profile for each of the wireless access point and/or the near-end gateway located within the Wi-Fi network, as well as for the far-end gateway located within the service provider network. Each bandwidth profile can include one or more bandwidth thresholds that the bandwidth manager can use while monitoring bandwidth usage at the wireless access point, the near-end gateway, and/or the far-end gateway.

Using his or her Wi-Fi-enabled device, the wireless device user can place a call, such as a voice call, a video call, or a data call, to another communications device (a smartphone, a tablet computer, a laptop computer). In an exemplary aspect, such placement of a call by the wireless device user using the Wi-Fi-enabled device can include accessing, over the Wi-Fi and service provider networks, the remote network (e.g., the Internet) to which the other communications device is communicably coupleable. Once the call is placed by the wireless device user using his or her Wi-Fi-enabled device, the wireless access point located within the Wi-Fi network deployed in the hotel venue can operate in conjunction with the Wi-Fi controller located within the service provider network in order to complete the call. Such call completion can involve an exchange of signaling between the wireless access point and the Wi-Fi controller via the near-end gateway, as well as a further exchange of signaling between the Wi-Fi controller and the far-end gateway.

Throughout the duration of the call, the bandwidth manager can monitor levels of bandwidth usage at least at the wireless access point and/or the near-end gateway located within the Wi-Fi network, as well as at the far-end gateway located within the service provider network. In an exemplary aspect, the bandwidth manager can monitor such bandwidth usage levels at each of the wireless access point, the near-end gateway, and/or the far-end gateway to obtain, for each respective access point and gateway device, a maximum bandwidth throughput required for each type (voice, video, data) of completed call, a current bandwidth usage for each call being handled by the respective access point or gateway device, and a total bandwidth usage for all calls being handled by the respective access point or gateway device relative to a bandwidth capacity of the respective device. Using the management interface included in each respective access point and gateway device, the bandwidth manager can (1) monitor, for one or more predetermined periods of time, a bandwidth usage level at each of the wireless access point, the near-end gateway, and/or the far-end gateway, and (2) perform end-to-end QoS control by dynamically making adjustments, as needed, to one or more of the service profile(s) stored in one or more of the respective access point and gateway devices based on the monitored bandwidth usage levels.

Having monitored the bandwidth usage levels at each of the wireless access point, the near-end gateway, and/or the far-end gateway, the bandwidth manager can obtain, for each respective access point and gateway device, the maximum bandwidth throughput required for the type (voice, video, data) of call placed by the wireless device user using his or her Wi-Fi-enabled device, the current bandwidth usage for the wireless device user's call, and the total bandwidth usage for all calls being handled by the respective access point or gateway device relative to the bandwidth capacity of the respective device. For example, the type of call placed by the wireless device user may be "voice." In the event the bandwidth manager determines, for the wireless access point, the near-end gateway, or the far-end gateway, that the total bandwidth usage for all calls being handled by the respective access point or gateway device has reached or exceeded a first bandwidth threshold corresponding to the bandwidth capacity of the respective device, and the current bandwidth usage for the wireless device user's voice call being handled by the respective access point or gateway device is less than a second bandwidth threshold corresponding to the maximum bandwidth throughput required for the voice call, the bandwidth manager can dynamically make adjustments to the service profile(s) stored at the respective access point or gateway device in an effort to maintain an optimal quality of service for the wireless device user at the hotel venue location. For example, the bandwidth manager may send a message to the respective access point or gateway device to request a change in its bandwidth profile, decreasing bandwidth allocations for inbound and/or outbound packet flows for any video calls and/or data calls being handled by the respective device, while at the same time increasing the available bandwidth at the respective access point or gateway device for handling the wireless device user's voice call. It is noted that the bandwidth manager may send such a message to the near-end gateway, which may be handling a packet flow that is subject to local breakout (such a packet flow subject to local breakout is also referred to herein as "local breakout traffic"). The bandwidth manager can dynamically make such adjustments to one or more of the services profiles stored at the wireless access point, the near-end gateway, and/or the far-end gateway throughout the duration of the wireless device user's call, thereby assuring that a consistent QoS policy for the hotel venue is enforced during the call by the wireless access point and/or the near-end gateway located within the Wi-Fi network, as well as by the far-end gateway located within the service provider network.

By providing a system that includes a bandwidth manager, a policy server, a near-end gateway located within a Wi-Fi network, and a far-end gateway located within a service provider network, in which the bandwidth manager can have access to one or more service profiles stored in a database of the policy server for use in (1) monitoring levels of bandwidth usage at least at the near-end gateway to the service provider network and at the far-end gateway to a remote network, and (2) performing end-to-end QoS control by dynamically making adjustments, as needed, to one or more service profiles stored at least at the near-end gateway and/or the far-end gateway based on the monitored bandwidth usage levels, optimal quality of service for wireless device users can, advantageously, be achieved.

Other features, functions, and aspects of the invention will be evident from the Detailed Description that follows.

BRIEF DESCRIPTION OF THE DRAWINGS

The accompanying drawings, which are incorporated in and constitute a part of this specification, illustrate one or more embodiments described herein and, together with the Detailed Description, explain these embodiments. In the drawings.

DETAILED DESCRIPTION

Systems and methods are disclosed for performing end-to-end Quality of Service (QoS) control during the access of Wireless Fidelity (Wi-Fi)-enabled communications devices to remote networks. The disclosed systems and methods can achieve such end-to-end QoS control by employing a bandwidth manager, a policy server, a near-end gateway located within a Wi-Fi network, and a far-end gateway located within a service provider network. Throughout the duration of a call placed by a wireless device user using a Wi-Fi-enabled communications device, the bandwidth manager can have access to one or more service profiles stored in a database of the policy server for use in (1) monitoring levels of bandwidth usage at least at the near-end gateway to the service provider network and at the far-end gateway to a remote network, and (2) performing end-to-end QoS control by dynamically making adjustments, as needed, to one or more service profiles stored at least at the near-end gateway and/or at the far-end gateway based on the monitored bandwidth usage levels.

Figure 1:
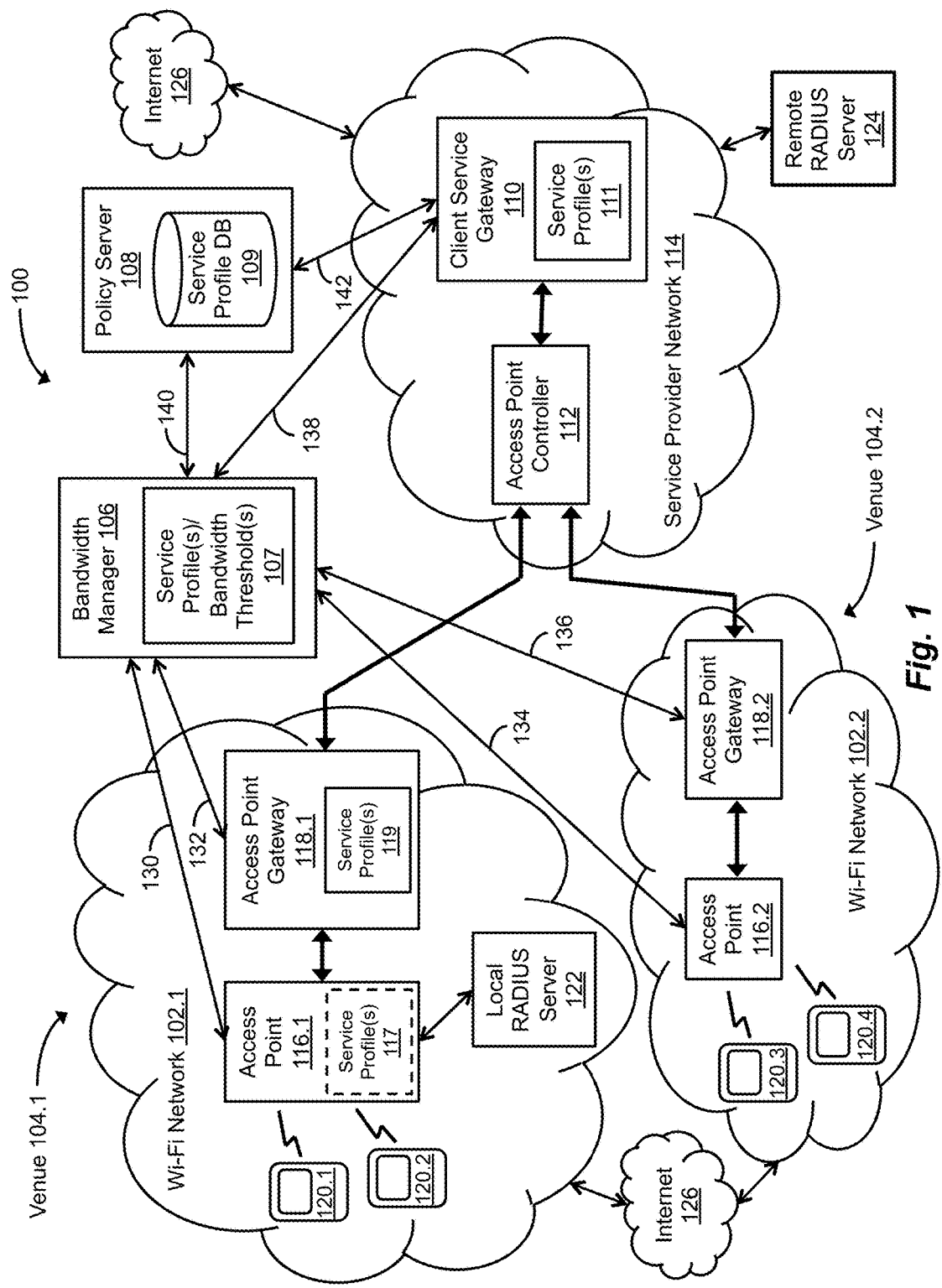
FIG. 1 is a block diagram illustrating an exemplary system for performing end-to-end Quality of Service (QoS) control during the access of a Wireless Fidelity (Wi-Fi)-enabled communications device to a remote network, in accordance with the present application.

FIG. 1 depicts an illustrative embodiment of an exemplary system 100 for performing end-to-end QoS control during the access of Wi-Fi-enabled communications devices to remote networks, in accordance with the present application. As shown in FIG. 1, the system 100 includes a bandwidth manager 106, a policy server 108, and a client service gateway 110 to a remote network 126, such as the Internet. The client service gateway 110 (also referred to herein as the "far-end gateway") is communicably couple-able to a wireless access point controller 112 (also referred to herein as the "Wi-Fi controller"). In one embodiment, the far-end gateway 110 and the Wi-Fi controller 112 can each be located within a service provider network 114. The Wi-Fi controller 112 is communicably coupled to at least one wireless access point through a respective wireless access point gateway to the service provider network 114. For example, the Wi-Fi controller 112 may be communicably coupled to a wireless access point 116.1 through a wireless access point gateway 118.1 to the service provider network 114, and/or communicably coupled to a wireless access point 116.2 through a wireless access point gateway 118.2 to the service provider network 114. The wireless access point gateway 118.1 (also referred to herein as a "near-end gateway") and the wireless access point 116.1 can each be located within a Wi-Fi network 102.1 deployed in a particular venue 104.1. Likewise, the wireless access point gateway 118.2 (also referred to herein as a "near-end gateway") and the wireless access point 116.2 can each be located within a Wi-Fi network 102.2 deployed in a particular venue 104.2, which can be different from the particular venue 104.1.

As further shown in FIG. 1, the policy server 108 can include a database (DB) 109 configured to store one or more service profiles, in which each service profile can specify one or more QoS classes for inbound and/or outbound packet flows based at least on the type (voice, video, data) of call placed by a wireless device user using a Wi-Fi-enabled communications device (also referred to herein as the "Wi-Fi-enabled device"). For example, such a Wi-Fi-enabled device may be one of a plurality of Wi-Fi-enabled devices 120.1, 120.2 operating within the Wi-Fi network 102.1 deployed in the venue 104.1, or one of a plurality of Wi-Fi-enabled devices 120.3, 120.4 operating within the Wi-Fi network 102.2 deployed in the venue 104.2. In one embodiment, the functionality of the policy server 108 can be incorporated into the far-end gateway 110. The bandwidth manager 106, the near-end gateways 118.1, 118.2, the far-end gateway 110, as well as the wireless access points 116.1, 116.2, can each likewise be configured to store one or more service profiles. For example, the bandwidth manager 106 may be configured to store service profile(s)/bandwidth threshold(s) 107, the near-end gateway 118.1 may be configured to store service profile(s) 119, the far-end gateway 110 may be configured to store service profile(s) 111, and the wireless access point 116.1 may be configured to store service profile(s) 117. In one embodiment, the bandwidth manager 106 can be further configured to store one or more bandwidth profiles including one or more bandwidth thresholds for use in monitoring bandwidth usage at one or more of the wireless access points 116.1, 116.2, the near-end gateways 118.1, 118.2 to the service provider network 114, and the far-end gateway 110 to the remote network 126. The wireless access points 116.1, 116.2, the near-end gateways 118.1, 118.2, and the far-end gateway 110 can each include a management interface through which the bandwidth manager 106 can (1) monitor levels of bandwidth usage at the respective access point and gateway devices, and (2) perform end-to-end QoS control by dynamically making adjustments, as needed, to the service profile(s) stored at one or more of the respective access point and gateway devices based on the monitored bandwidth usage levels.

In an exemplary mode of operation, the wireless device user using the Wi-Fi-enabled device 120.1 (e.g., a Wi-Fi-enabled smartphone, tablet computer, laptop computer) can enter a communication range of the wireless access point 116.1 located within the Wi-Fi network 102.1 deployed in the venue 104.1. For example, the venue 104.1 may be a hotel venue (or any other suitable venue) that is a subscriber or account holder of the service provider network 114. Having entered the communication range of the wireless access point 116.1, the Wi-Fi-enabled device 120.1 can receive, from the wireless access point 116.1, a beacon message indicating that the wireless access point 116.1 is configured to support Hotspot 2.0, which is a technology based on the Institute of Electrical and Electronic Engineers (IEEE) 802.11u, 802.11i, and 802.1x standards and generally known as Wi-Fi-certified Passpoint™, or any other suitable wireless technology. If the Wi-Fi-enabled device 120.1 is also configured to support Hotspot 2.0, then the Wi-Fi-enabled device 120.1 can, using a protocol defined in one or more of the IEEE 802.11 series of standards, exchange messages with the wireless access point 116.1 in order to become associated with the wireless access point 116.1, and also exchange messages with an authentication server in order to be authenticated by the authentication server. For example, such an authentication server may be a local authentication server 122 (also referred to herein as the "local RADIUS server") located within the Wi-Fi network 102.1, or a remote authentication server 124 (also referred to herein as the "remote RADIUS server") communicably coupled to the service provider network 114. Further, each of the local and remote RADIUS servers 122, 124 may be configured to conform to the Remote Authentication Dial-In User Service (RADIUS) protocol, or any other suitable protocol.

As employed herein, the term "associated with" encompasses a process by which a Wi-Fi-enabled device can establish a data link with a wireless access point within a Wi-Fi network. For example, the Wi-Fi-enabled device may become associated with the wireless access point by sending, to the wireless access point, an association request frame that includes the Wi-Fi-enabled device's service set identifier (SSID) and supported data rates. Further, once the wireless access point receives the Wi-Fi-enabled device's SSID and supported data rates, the wireless access point may send, to the Wi-Fi-enabled device, an association response frame that contains an association identifier (ID), as well as any other suitable information pertaining to the wireless access point. As further employed herein, the term "authenticated by" encompasses a process by which a Wi-Fi-enabled device can send, to a local or remote RADIUS server (or any other suitable authentication server) via a wireless access point, authentication credentials that identify the wireless device user as being authorized to access the Wi-Fi network. Such authentication credentials can include the media access control (MAC) address(es) of the Wi-Fi-enabled device and/or the wireless access point, the SSID of a service provider network, and/or any other suitable authentication information.

Once the Wi-Fi-enabled device 120.1 becomes associated with the wireless access point 116.1 and is authenticated by the local or remote RADIUS server 122, 124, the wireless device user can place a call, such as a voice call, a video call, or a data call, to another communications device, such as a smartphone, a tablet computer, or a laptop computer. Such placement of a call by the wireless device user using the Wi-Fi-enabled device 120.1 can include accessing, over the Wi-Fi network 102.1 and the service provider network 114, the remote network 126 (e.g., the Internet) to which the other communications device is communicably coupleable. In one embodiment, such call placement by the wireless device user using the Wi-Fi-enabled device 120.1 can further include tagging, by the wireless access point 116.1, a packet flow for the call with QoS bits indicative of a QoS level appropriate for the type (voice, video, data) of call. For example, a voice call may require an enhanced QoS level, a data call may have a reduced QoS level, and a video call may require a QoS level that is intermediate to the respective QoS levels of the voice and data calls. The service profile(s) 117 stored in the wireless access point 116.1 and/or the service profile(s) 119 stored in the near-end gateway 118.1 can each be configured to store a service profile for the venue 104.1, in which the stored service profile(s) include a QoS policy that specifies one or more QoS levels for calls placed by wireless device users using their Wi-Fi-enabled devices at the venue location. In one embodiment, such a QoS policy is enforceable by the wireless access point 116.1 and/or the near-end gateway 118.1 located within the Wi-Fi network 102.1 deployed in the venue 104.1.

In this exemplary mode of operation, the near-end gateway 118.1 located within the Wi-Fi network 102.1 can send the packet flow for the call placed by the wireless device user using the Wi-Fi-enabled device 120.1 to the Wi-Fi controller 112 located within the service provider network 114. The Wi-Fi controller 112 can then forward the call packet flow (such a forwarded call packet flow is also referred to herein as "tunneled traffic") to the far-end gateway 110, which is also located within the service provider network 114. In one embodiment, the call packet flow can be identified by a network address or any other suitable packet flow identifier, which the far-end gateway 110 can use to determine that the tunneled traffic originated from the location of the venue 104.1. Upon determining that the tunneled traffic originated from the location of the venue 104.1 (which, in this exemplary mode of operation, is a subscriber or account holder of the service provider network 114), the far-end gateway 110 can send, over a communications path 142, a message to the policy server 108 in order to request a copy of the service profile for the venue 104.1. In an alternative embodiment, the policy server 108 can push the copy of the service profile for the venue 104.1 to the far-end gateway 110 over the communications path 142. It is noted that the QoS bits tagged to the packet flow for the call by the wireless access point 116.1 located within the Wi-Fi network 102.1 might have been stripped off the call packet flow or otherwise lost by the time the call packet flow reached the service provider network 114. In one embodiment, the service profile for the venue 104.1 can include the venue's identification (ID) profile, bandwidth profile, QoS profile, access profile, and/or any other suitable profile information pertaining to the venue's subscription to the service provider network 114. The service profile for the venue 104.1 can also specify one or more QoS classes for inbound and/or outbound packet flows based at least on the types (voice, video, data) of calls placed by wireless device users using their Wi-Fi-enabled devices at the venue location. Each QoS class can define, for each type (voice, video, data) of call, at least a preferential bandwidth allocation for inbound and/or outbound packet flows, a preferential routing of the respective packet flows, and/or a preferential queuing of the respective packet flows, etc.

Having received the request message from the far-end gateway 110 for a copy of the service profile for the venue 104.1, the policy server 108 can access the venue's service profile from its service profile DB 109, send a copy of the venue's service profile over the communications path 142 to the far-end gateway 110 for storage therein as part of its service profile(s) 111, and forward a copy of the same service profile for the venue 104.1 over a communications path 140 to the bandwidth manager 106 for storage therein as part of its service profile(s)/bandwidth threshold(s) 107. The policy server 108 can further forward, over the communications path 140 to the bandwidth manager 106, information pertaining to any possible change(s) in a QoS policy included in the service profile for the venue 104.1. In one embodiment, a system administrator can configure the bandwidth manager 106 to store a bandwidth profile for each of the wireless access point 116.1 and/or the near-end gateway 118.1 located within the Wi-Fi network 102.1 (as well as each of the wireless access point 116.2 and/or the near-end gateway 118.2 located within the Wi-Fi network 102.2), and the far-end gateway 110 located within the service provider network 114. Each bandwidth profile can include one or more bandwidth thresholds that the bandwidth manager 106 can use to monitor bandwidth usage at one or more of the wireless access points 116.1, 116.2, the near-end gateways 118.1, 118.2, and/or the far-end gateway 110. It is noted that the bandwidth profile for the near-end gateway 118.1 (as well as the near-end gateway 118.2) can further include one or more bandwidth thresholds that the bandwidth manager 106 can use to monitor bandwidth usage for a packet flow that is subject to local breakout (such a packet flow subject to local breakout is also referred to herein as "local breakout traffic"). Such bandwidth thresholds can be enforced by the near-end gateway 118.1 (or the near-end gateway 118.2) while handling the local breakout traffic.

Using the Wi-Fi-enabled device 120.1, the wireless device user can place a call, such as a voice call, a video call, or a data call, to another communications device (a smartphone, a tablet computer, a laptop computer). In one embodiment, such placement of a call by the wireless device user using the Wi-Fi-enabled device 120.1 can include accessing, over the Wi-Fi network 102.1 and service provider network 114, the remote network 126 (e.g., the Internet) to which the other communications device is communicably coupleable. Once the call is placed by the wireless device user using the Wi-Fi-enabled device 120.1, the wireless access point 116.1 located within the Wi-Fi network 102.1 can operate in conjunction with the Wi-Fi controller 112 located within the service provider network 114 in order to complete the call. Such call completion can involve an exchange of signaling between the wireless access point 116.1 and the Wi-Fi controller 112 via the near-end gateway 118.1, as well as a further exchange of signaling between the Wi-Fi controller 112 and the far-end gateway 110.

Throughout the duration of the call, the bandwidth manager 106 can monitor levels of bandwidth usage at the wireless access point 116.1 and/or the near-end gateway 118.1 located within the Wi-Fi network 102.1, as well as at the far-end gateway 110 located within the service provider network 114. For example, the bandwidth manager 106 may monitor the level of bandwidth usage at the wireless access point 116.1 over a communications path 130, and monitor the level of bandwidth usage at the near-end gateway 118.1 over a communications path 132. Likewise, the bandwidth manager 106 may monitor the level of bandwidth usage at the wireless access point 116.2 over a communications path 134, and monitor the level of bandwidth usage at the near-end gateway 118.2 over a communications path 136. Further, the bandwidth manager 106 may monitor the level of bandwidth usage at the far-end gateway 110 over a communications path 138. In one embodiment, the bandwidth manager 106 can monitor such bandwidth usage levels at each of the wireless access point 116.1, the near-end gateway 118.1, and/or the far-end gateway 110 in order to obtain, for each respective access point or gateway device, a maximum bandwidth throughput required for each type (voice, video, data) of call completed using the wireless access point 116.1 and the Wi-Fi controller 112, a current bandwidth usage for each call being handled by the respective access point or gateway device 116.1, 118.1, 110, and a total bandwidth usage for all calls being handled by the respective access point or gateway device 116.1, 118.1, 110 relative to a bandwidth capacity of the respective device 116.1, 118.1, 110. Using the management interface included in each respective access point or gateway device 116.1, 118.1, 110, the bandwidth manager 106 can (1) monitor, for one or more predetermined periods of time, a bandwidth usage level at each of the wireless access point 116.1, the near-end gateway 118.1, and/or the far-end gateway 110, and (2) perform end-to-end QoS control by dynamically making adjustments, as needed, to the service profile(s) stored in one or more of the respective access point or gateway devices 116.1, 118.1, 110 based on the monitored bandwidth usage levels.

Having monitored the bandwidth usage levels at each of the wireless access point 116.1, the near-end gateway 118.1, and/or the far-end gateway 110, the bandwidth manager 106 can obtain, for each respective access point or gateway device 116.1, 118.1, 110, the maximum bandwidth throughput required for the type (voice, video, data) of call placed by the wireless device user using the Wi-Fi-enabled device 120.1, the current bandwidth usage for the wireless device user's call, and the total bandwidth usage for all calls being handled by the respective access point or gateway device 116.1, 118.1, 110 relative to the bandwidth capacity of the respective device 116.1, 118.1, 110. For example, the type of call placed by the wireless device user using the Wi-Fi-enabled device 120.1 may be "voice." In the event the bandwidth manager 106 determines, for one or more of the wireless access point 116.1, the near-end gateway 118.1, and the far-end gateway 110, that (1) the total bandwidth usage for all calls being handled by the respective access point or gateway device 116.1, 118.1, 110 has reached or exceeded a first bandwidth threshold corresponding to the bandwidth capacity of the respective device 116.1, 118.1, 110, and (2) the current bandwidth usage for the wireless device user's voice call being handled by the respective access point or gateway device 116.1, 118.1, 110 is less than a second bandwidth threshold corresponding to the maximum bandwidth throughput required for the voice call, the bandwidth manager 106 can dynamically make adjustments to the service profile(s) stored at the respective device(s) 116.1, 118.1, and/or 110 in an effort to maintain an optimal quality of service for the wireless device user at the venue location.

For example, the bandwidth manager 106 may send at least one message to one or more of the respective access point and gateway devices 116.1, 118.1, 110 to request a change in its bandwidth profile, at least temporarily decreasing bandwidth allocations for inbound and/or outbound packet flows for any video calls and/or data calls being handled by the respective device(s) 116.1, 118.1, 110, while at the same time increasing the available bandwidth at the respective access point or gateway device(s) 116.1, 118.1, 110 for handling the wireless device user's voice call. It is noted that the bandwidth manager 106 may send such a message to the near-end gateway 118.1 (as well as the near-end gateway 118.2), which may be handling local breakout traffic. Such local breakout traffic can be forwarded by the near-end gateway 118.1 (or the near-end gateway 118.2) directly to the remote network 126 (e.g., the Internet), without first having to forward the corresponding packet flow as tunneled traffic to the far-end gateway 110.

In this way, the disclosed system 100 can synchronize QoS control at the near-end gateway 118.1 and the far-end gateway 110 in order to avoid having to drop packets for the voice call at either one of the respective near-end and far-end gateway device(s) 118.1, 110. Further, as packet flow conditions change and/or allow within the Wi-Fi network 102.1 and/or the service provider network 114, the bandwidth manager 106 may send at least another message to one or more of the respective access point and gateway devices 116.1, 118.1, 110 to request a further change in its bandwidth profile, at least temporarily increasing and/or decreasing bandwidth allocations for inbound and/or outbound packet flows for any voice calls, video calls, and/or data calls being handled by the respective device(s) 116.1, 118.1, 110. The bandwidth manager 106 can dynamically make such adjustments to one or more of the services profile(s) 117, 119, and 111 stored at the wireless access point 116.1, the near-end gateway 118.1, and the far-end gateway 110, respectively, throughout the duration of the wireless device user's call, thereby assuring that a consistent QoS policy for the venue 104.1 can be enforced during the call by the wireless access point 116.1 and/or the near-end gateway 118.1 located within the Wi-Fi network 102.1, as well as by the far-end gateway 110 located within the service provider network 114.

Figure 2:
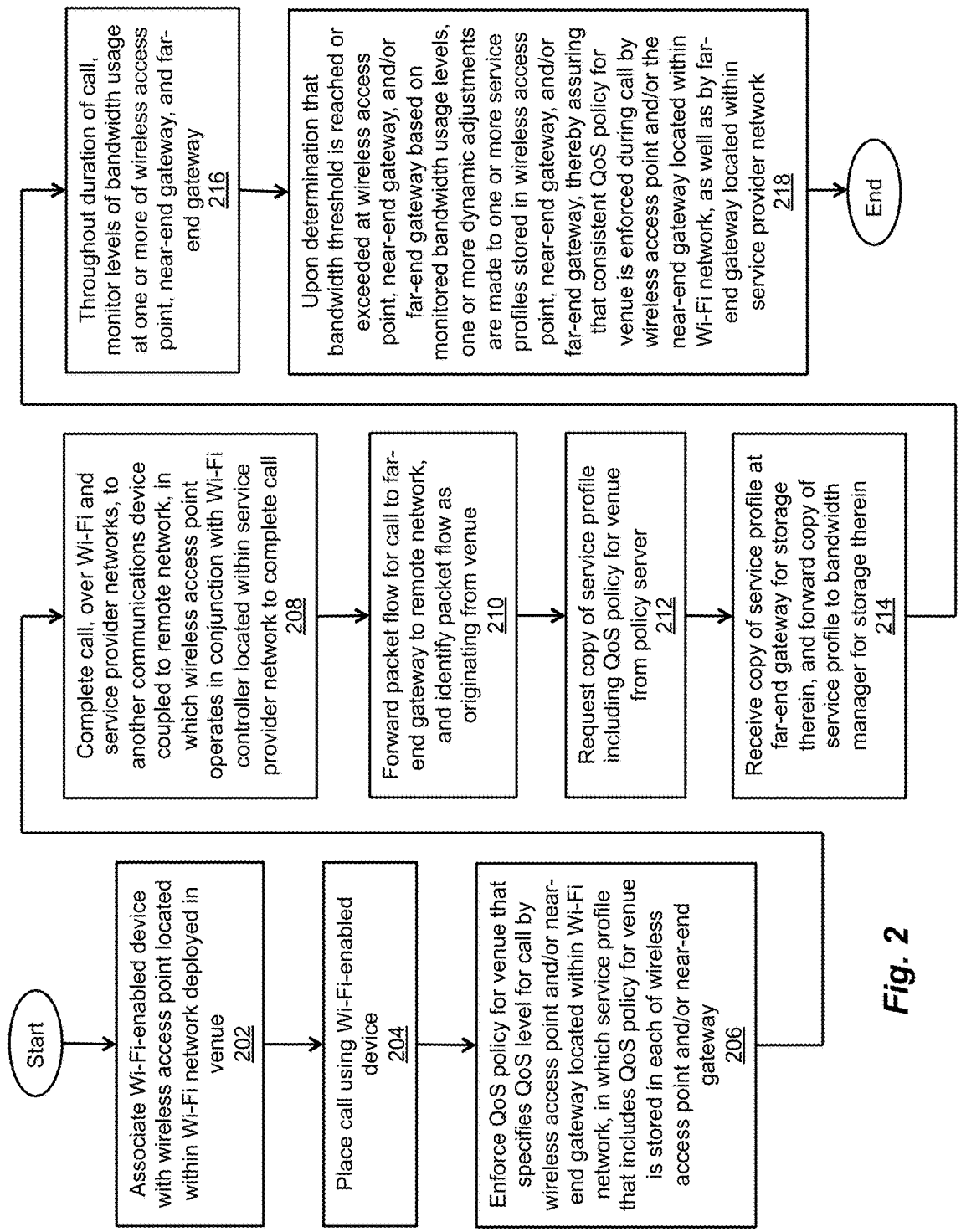
FIG. 2 is a flow diagram of an exemplary method of performing end-to-end QoS control during the access of a Wi-Fi-enabled communications device to a remote network, using the system of FIG. 1.

FIG. 2 depicts an exemplary method of performing end-to-end QoS control during the access of a Wi-Fi-enabled device to a remote network, using the system 100 of FIG. 1. As depicted in block 202 (see FIG. 2), a Wi-Fi-enabled device (such as the Wi-Fi-enabled device 120.1; see FIG. 1) becomes associated with the wireless access point 116.1 located within the Wi-Fi network 102.1 deployed in the venue 104.1 (see FIG. 1). As depicted in block 204, a call is placed by a wireless device user using the Wi-Fi-enabled device 120.1. As depicted in block 206, a QoS policy for the venue 104.1 that specifies a QoS level for the call is enforced by the wireless access point 116.1 and/or the near-end gateway 118.1 located within the Wi-Fi network 102.1, in which a service profile that includes the QoS policy for the venue 104.1 is stored in each of the wireless access point 116.1 and/or the near-end gateway 118.1. As depicted in block 208, the call is completed, over the Wi-Fi and service provider networks 102.1, 114, to another communications device coupled to the remote network 126, in which the wireless access point 116.1 located within the Wi-Fi network 102.1 operates in conjunction with the Wi-Fi controller 112 located within the service provider network 114 to complete the call. As depicted in block 210, a packet flow for the call is forwarded, by the Wi-Fi controller 112, to the far-end gateway 110 to the remote network 126, and identified, by the far-end gateway 110, as originating from the venue 104.1. As depicted in block 212, a copy of the service profile including the QoS policy for the venue 104.1 is requested, by the far-end gateway 110, from the policy server 108. As depicted in block 214, a copy of the service profile is received at the far-end gateway 110 for storage therein, and forwarded, by the policy server 108, to the bandwidth manager 106 for storage therein. As depicted in block 216, throughout the duration of the call, levels of bandwidth usage are monitored, by the bandwidth manager 106, at one or more of the wireless access point 116.1, the near-end gateway 118.1, and the far-end gateway 110. As depicted in block 218, upon a determination that a bandwidth threshold is reached or exceeded at the wireless access point 116.1, the near-end gateway 118.1, and/or the far-end gateway 110 based on the monitored bandwidth usage levels, one or more dynamic adjustments are made, by the bandwidth manager 106, to one or more of the service profiles stored in the wireless access point 116.1, the near-end gateway 118.1, and/or the far-end gateway 110, thereby assuring that a consistent QoS policy for the venue 104.1 is enforced during the call by the wireless access point 116.1 and/or the near-end gateway 118.1 located within the Wi-Fi network 102.1, as well as by the far-end gateway 110 located within the service provider network 114.

Figure 3:
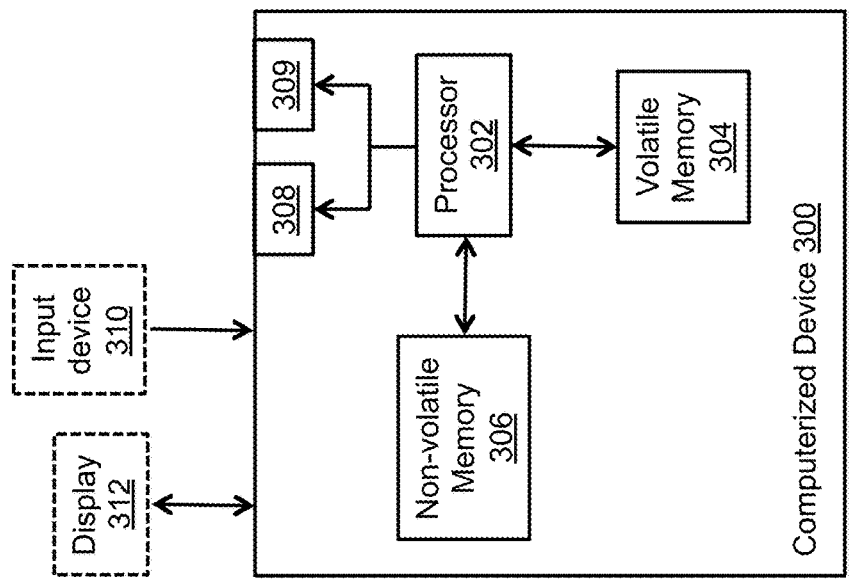
FIG. 3 is a block diagram of an exemplary computerized device upon which systems and methods described herein can be implemented.

A number of the exemplary systems and methods described herein can be implemented, at least in part, with any of a variety of server computers, client computers, and/or computerized devices. FIG. 3 depicts an illustrative embodiment of an exemplary computerized device 300, which includes a processor 302 coupled to a volatile memory 304 and a non-volatile memory 306. The computerized device 300 can further include a network access port 308 for establishing a data connection with other computer(s) and/or computerized device(s) over a network, a management interface 309 for use in monitoring levels of bandwidth usage at the computerized device 300 and making dynamic adjustments to profile information stored in the computerized device 300 based on the monitored bandwidth usage levels, an optional input device 310 (a keyboard, a mouse, a track pad), and an optional display 312 (a liquid crystal display (LCD) display, a light emitting diode (LED) display).

Figure 4:
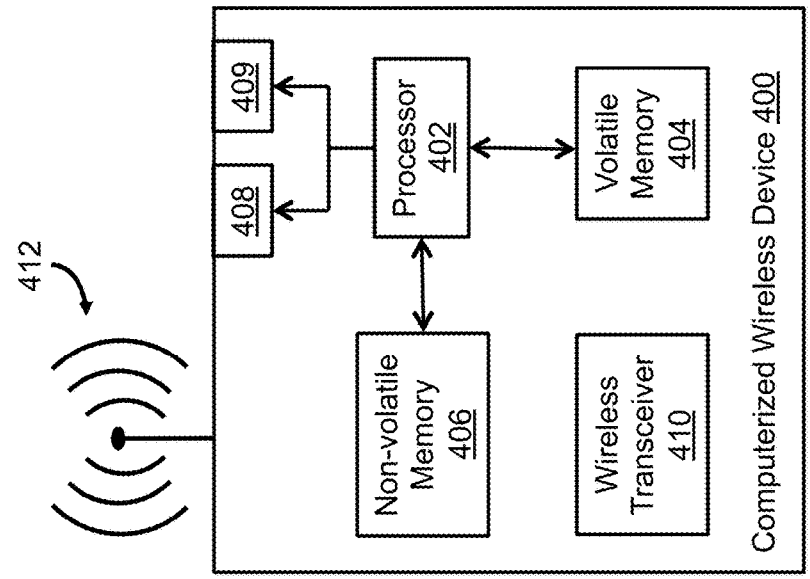
FIG. 4 is a block diagram of an exemplary wireless computerized device upon which systems and methods described herein can be implemented.

FIG. 4 depicts an illustrative embodiment of an exemplary computerized wireless device 400, which includes a processor 402 coupled to a volatile memory 404 and a non-volatile memory 406. Like the computerized device 300 of FIG. 3, the wireless computerized device 400 of FIG. 4 can further include a network access port 408 for establishing a data connection with one or more computers and/or computerized devices over a network, and a management interface 409 for use in monitoring levels of bandwidth usage at the computerized wireless device 400 and making dynamic adjustments to profile information stored in the computerized wireless device 400 based on the monitored bandwidth usage levels. The wireless computerized device 400 can still further include a wireless transceiver 410 for establishing wireless communications with one or more wireless user devices via an antenna 412. The wireless transceiver 410 can conform to one or more of the IEEE 802.11 series of standards, or any other suitable wireless standards.

The foregoing method descriptions and the process flow diagrams are provided herein merely as illustrative examples, and are not intended to require or imply that the steps of the various embodiments must be performed in the order presented. One of ordinary skill in the art will appreciate that the order of steps in the foregoing embodiments can be performed in any suitable order. Further, terms such as "thereafter," "then," "next," etc., are not intended to limit the order of the steps. In addition, any references to claim elements in the singular, e.g., using the articles "a," "an," or "the," are not to be construed as limiting the respective claim elements to the singular.

The various illustrative logical blocks, modules, circuits, and/or algorithmic steps described in connection with the embodiments disclosed herein can be implemented as electronic hardware, computer software, or combinations of both. To illustrate this interchangeability of hardware and software, various illustrative components, blocks, modules, circuits, and/or steps have been described herein generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present application. The functionality of various logical blocks described herein can be performed by any other suitable logical blocks and/or circuits, and/or any other suitable additional logical blocks and/or circuits that are not separately illustrated herein.

The hardware used to implement the various illustrative logical blocks, modules, and/or circuits described in connection with the aspects disclosed herein can be implemented or performed with a general purpose processor, a digital signal processor (DSP), an application specific integrated circuit (ASIC), a field programmable gate array (FPGA), and/or other programmable logic device, discrete gate or transistor logic, discrete hardware components, and/or any combination thereof designed to perform the functions described herein. A general-purpose processor can be a microprocessor, however the processor can be any other suitable processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Alternatively, some blocks and/or methods described herein can be performed by circuitry that is specific to a given function.

In one or more exemplary aspects, the functions described herein can be implemented in hardware, software, firmware, or any combination thereof. If implemented in software, the functions can be stored as one or more instructions or code on a computer-readable medium. The blocks of a method or algorithm disclosed herein can be embodied in a processor-executable software module, which can reside on a computer-readable medium. Computer-readable media can include both computer storage media and communication media, including any medium that facilitates transfer of a computer program from one place to another. Storage media can be any available media that can be accessed by a computer. By way of example and not limitation, such computer-readable media can comprise RAM, ROM, EEPROM, CD-ROM or other optical disk storage, magnetic disk storage or other magnetic storage devices, and/or any other suitable medium that can be used to carry or store desired program code in the form of instructions and/or data structures and that can be accessed by a computer. Any connection can also be properly termed as a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of the medium. The terms "disk" and "disc," as employed herein, can include compact discs (CD), laser discs, optical discs, digital versatile discs (DVD), hard disks, floppy disks, and/or Blu-Ray discs. In addition, the operations of a method or algorithm can reside as one or any combination or set of codes and/or instructions on a machine readable medium and/or computer-readable medium, which can be incorporated into a computer program product.

It will be appreciated by those of ordinary skill in the art that modifications to and variations of the above-described systems and methods may be made without departing from the inventive concepts disclosed herein. Accordingly, the invention should not be viewed as limited except as by the scope and spirit of the appended claims.

What is claimed is:

1. A method of performing end-to-end Quality of Service (QoS) control during an access of a Wireless Fidelity (Wi-Fi)-enabled communications device to a remote network, the method comprising:

receiving a packet flow for a call at a far-end gateway to the remote network;

identifying, by the far-end gateway, the packet flow for the call as originating from a venue, the venue being a subscriber of a service provider network;

accessing, by the far-end gateway, a service profile for the venue, the service profile including a QoS policy for the venue;

accessing, at a bandwidth manager, the service profile for the venue;

monitoring, by the bandwidth manager during the call, one or more levels of bandwidth usage at one or more of a wireless access point deployed in the venue, a near-end gateway to the service provider network, and the far-end gateway, one or more of the wireless access point and the near-end gateway having access to the service profile for the venue; and dynamically adjusting, by the bandwidth manager, the service profile at one or more of the wireless access point, the near-end gateway, and the far-end gateway based at least in part on the monitored levels of bandwidth usage, thereby assuring that a consistent QoS policy for the venue is enforced during the call by one or more of the wireless access point, the near-end gateway, and the far-end gateway.

2. The method of claim 1 wherein the identifying of the packet flow for the call as originating from the venue includes accessing a network address from the packet flow for the call, and determining that the packet flow for the call originates from the venue based on the network address.

3. The method of claim 1 further comprising:

sending, by the far-end gateway, a message to a policy server in order to request a copy of the service profile for the venue; and receiving, at the far-end gateway, the copy of the service profile for the venue from the policy server.

4. The method of claim 3 further comprising:

receiving, at the bandwidth manager, a further copy of the service profile for the venue from the policy server.

5. The method of claim 1 further comprising:

pushing, by a policy server, a copy of the service profile for the venue to the far-end gateway.

6. The method of claim 1 further comprising:

accessing, by the bandwidth manager, a bandwidth profile for each of one or more of the wireless access point, the near-end gateway, and the far-end gateway, each bandwidth profile including one or more predetermined bandwidth thresholds for use by the bandwidth manager in the monitoring of the one or more levels of bandwidth usage at one or more of the wireless access point, the near-end gateway, and the far-end gateway.

7. The method of claim 1 wherein the dynamically adjusting of the one or more service profiles at one or more of the wireless access point, the near-end gateway, and the far-end gateway includes sending a message to one or more of the wireless access point, the near-end gateway, and the far-end gateway to request a change in a bandwidth profile included in one or more of the respective service profiles.

8. The method of claim 7 wherein the sending of the message to request the change in the bandwidth profile included in one or more service profiles includes sending the message to request at least a temporary decrease in a bandwidth allocation for at least one packet flow for at least one specified type of call handled by one or more of the wireless access point, the near-end gateway, and the far-end gateway.

9. The method of claim 7 wherein the sending of the message to request the change in the bandwidth profile included in one or more service profiles includes sending the message to request at least a temporary increase in a bandwidth allocation for at least one packet flow for at least one specified type of call handled by one or more of the wireless access point, the near-end gateway, and the far-end gateway.

10. The method of claim 1 further comprising:
receiving a further packet flow at the near-end gateway, the further packet flow including local breakout traffic,
wherein the monitoring of the one or more levels of bandwidth usage includes monitoring, by the bandwidth manager, one or more levels of bandwidth usage at the near-end gateway for the local breakout traffic.

11. A system for performing end-to-end Quality of Service (QoS) control during an access of a Wireless Fidelity (Wi-Fi)-enabled communications device to a remote network, the system comprising:
a far-end gateway to the remote network, the far-end gateway being operative:
to receive a packet flow for a call;
to identify the packet flow for the call as originating from a venue, the venue being a subscriber of a service provider network; and
to access a service profile for the venue; and
a bandwidth manager operative:
to access the service profile for the venue;
to monitor, during the call, one or more levels of bandwidth usage at one or more of a wireless access point deployed in the venue, a near-end gateway to the service provider network, and the far-end gateway, one or more of the wireless access point and the near-end gateway having access to the service profile for the venue; and
to dynamically adjust the service profile at one or more of the wireless access point, the near-end gateway, and the far-end gateway based at least in part on the monitored levels of bandwidth usage, thereby assuring that a consistent QoS policy for the venue is enforced during the call by one or more of the wireless access point, the near-end gateway, and the far-end gateway.

12. The system of claim 11 wherein the far-end gateway is further operative to access a network address from the packet flow for the call, and to determine that the packet flow for the call originates from the venue based on the network address.

13. The system of claim 11 wherein the far-end gateway is further operative to send a message to a policy server in order to request a copy of the service profile for the venue, and to receive the copy of the service profile for the venue from the policy server.

14. The system of claim 13 wherein the bandwidth manager is further operative to receive a further copy of the service profile for the venue from the policy server.

15. The system of claim 11 further comprising:
a policy server operative to push a copy of the service profile for the venue to the far-end gateway.

16. The system of claim 11 wherein the bandwidth manager is further operative to access a bandwidth profile for each of one or more of the wireless access point, the near-end gateway, and the far-end gateway, each bandwidth profile including one or more predetermined bandwidth thresholds for use by the bandwidth manager in the monitoring of the one or more levels of bandwidth usage at one or more of the wireless access point, the near-end gateway, and the far-end gateway.

17. The system of claim 11 wherein the bandwidth manager is further operative to send a message to one or more of the wireless access point, the near-end gateway, and the far-end gateway to request a change in a bandwidth profile included in one or more of the respective service profiles.

18. The system of claim 17 wherein the bandwidth manager is further operative to send the message to request at least a temporary decrease in a bandwidth allocation for at least one packet flow for at least one specified type of call handled by one or more of the wireless access point, the near-end gateway, and the far-end gateway.

19. The system of claim 17 wherein the bandwidth manager is further operative to send the message to request at least a temporary increase in a bandwidth allocation for at least one packet flow for at least one specified type of call handled by one or more of the wireless access point, the near-end gateway, and the far-end gateway.

20. The system of claim 11 wherein the near-end gateway is operative to receive a further packet flow, the further packet flow including local breakout traffic, and wherein the bandwidth manager is further operative to monitor one or more levels of bandwidth usage at the near-end gateway for the local breakout traffic.

21. A bandwidth manager for use in performing end-to-end Quality of Service (QoS) control during an access of a Wireless Fidelity (Wi-Fi)-enabled communications device to a remote network, the Wi-Fi-enabled communications device being associated with a wireless access point within a Wi-Fi network deployed in a venue, the wireless access point being communicably coupled to a near-end gateway to a service provider network, the service provider network including a Wi-Fi controller, the wireless access point operating in conjunction with the Wi-Fi controller to complete a call placed using the Wi-Fi-enabled communications device to another communication device coupleable to the remote network, one or more of the wireless access point and the near-end gateway accessing a service profile that includes a QoS policy for the venue and enforcing the QoS policy within the Wi-Fi network, a packet flow for the call being received at the Wi-Fi controller from the near-end gateway, the packet flow for the call being further received at a far-end gateway to the remote network from the Wi-Fi controller, the far-end gateway identifying the packet flow for the call as originating from the venue, the venue being a subscriber of the service provider network, the far-end gateway accessing a copy of the service profile for the venue, the bandwidth manager comprising:
a database;
a memory; and
a processor operative to execute at least one computer program out of the memory:
to receive a further copy of the service profile for the venue;
to access the further copy of the service profile for the venue in the database;
to monitor, during the call, one or more levels of bandwidth usage at one or more of the wireless access point, the near-end gateway, and the far-end gateway; and
to dynamically adjust one or more of the service profiles at one or more of the wireless access point, the near-end gateway, and the far-end gateway based at least in part on the monitored levels of bandwidth usage, thereby assuring that a consistent QoS policy for the venue is enforced during the call by one or more of the wireless access point and the near-end gateway located within the Wi-Fi network, and by the far-end gateway located within the service provider network.

22. The bandwidth manager of claim 21 wherein the processor is further operative to execute the at least one computer program out of the memory to send a message to one or more of the wireless access point, the near-end gateway, and the far-end gateway to request a change in a bandwidth profile included in one or more of the respective service profiles, wherein the change in the bandwidth profile includes at least a temporary decrease or increase in a bandwidth allocation for at least one packet flow for at least one specified type of call handled by one or more of the wireless access point, the near-end gateway, and the far-end gateway.

23. The bandwidth manager of claim 21 wherein the near-end gateway is operative to receive a further packet flow, the further packet flow including local breakout traffic, and wherein the bandwidth manager is further operative to monitor one or more levels of bandwidth usage at the near-end gateway for the local breakout traffic.

24. A method of performing end-to-end Quality of Service (QoS) control during an access of a communications device to a remote network, the method comprising:
   receiving a packet flow for a call at a far-end gateway to the remote network;
   identifying, by the far-end gateway, the packet flow for the call as originating from a venue, the venue being a subscriber of a service provider network;
   accessing, by the far-end gateway, a service profile for the venue, the service profile including a QoS policy for the venue;
   receiving, at the far-end gateway, a request for a change in the service profile for the venue, the request for the change in the service profile being based at least on monitored levels of bandwidth usage at one or more of a wireless access point deployed in the venue, a near-end gateway to the service provider network, and the far-end gateway to the remote network; and
   dynamically adjusting the service profile at the far-end gateway based at least on the monitored levels of bandwidth usage, thereby assuring that a consistent QoS policy for the venue is enforced during the call.

25. The method of claim 24 wherein the receiving of the request for the change in the service profile includes receiving a request for a change in a bandwidth profile included in the service profile.

26. The method of claim 24 wherein the receiving of the request for the change in the service profile includes receiving a request for at least a temporary decrease in a bandwidth allocation for at least one packet flow for at least one specified type of call handled by the far-end gateway.

27. The method of claim 24 wherein the receiving of the request for the change in the service profile includes receiving a request for at least a temporary increase in a bandwidth allocation for at least one packet flow for at least one specified type of call handled by the far-end gateway.

28. A far-end gateway to a remote network, for use in performing end-to-end Quality of Service (QoS) control during an access of a communications device to the remote network, the far-end gateway comprising:
   a memory; and
   a processor operative to execute at least one computer program out of the memory:
      to receive a packet flow for a call;
      to identify the packet flow for the call as originating from a venue, the venue being a subscriber of a service provider network;
      to access a service profile for the venue, the service profile including a QoS policy for the venue;
      to receive a request for a change in the service profile for the venue, the request for the change in the service profile being based at least on monitored levels of bandwidth usage at one or more of a wireless access point deployed in the venue, a near-end gateway to the service provider network, and the far-end gateway to the remote network; and
      to dynamically adjust the service profile based at least on the monitored levels of bandwidth usage, thereby assuring that a consistent QoS policy for the venue is enforced during the call.

29. The far-end gateway of claim 28 wherein the processor is further operative to execute the at least one computer program out of the memory to receive a request for a change in a bandwidth profile included in the service profile.

30. The far-end gateway of claim 28 wherein the processor is further operative to execute the at least one computer program out of the memory to receive a request for at least a temporary decrease in a bandwidth allocation for at least one packet flow for at least one specified type of call handled by the far-end gateway.

31. The far-end gateway of claim 28 wherein the processor is further operative to execute the at least one computer program out of the memory to receive a request for at least a temporary increase in a bandwidth allocation for at least one packet flow for at least one specified type of call handled by the far-end gateway.

* * * * *